US010601151B2

(12) United States Patent
Nakamura

(10) Patent No.: US 10,601,151 B2
(45) Date of Patent: Mar. 24, 2020

(54) ELECTRIC CONNECTION STRUCTURE AND IMAGE FORMING APPARATUS

(71) Applicant: SHARP KABUSHIKI KAISHA, Sakai, Osaka (JP)

(72) Inventor: Ginga Nakamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/215,271

(22) Filed: Dec. 10, 2018

(65) Prior Publication Data

US 2019/0181567 A1 Jun. 13, 2019

(30) Foreign Application Priority Data

Dec. 12, 2017 (JP) ................................ 2017-237993

(51) Int. Cl.

*B01D 24/00* (2006.01)
*H01R 4/48* (2006.01)
*H01R 4/64* (2006.01)
*H01R 35/02* (2006.01)
*H01R 13/24* (2006.01)
*H01R 13/66* (2006.01)

(52) U.S. Cl.

CPC ............ *H01R 4/4863* (2013.01); *H01R 4/64* (2013.01); *H01R 35/025* (2013.01); *H01R 13/2421* (2013.01); *H01R 13/6616* (2013.01)

(58) Field of Classification Search

CPC .... B01D 29/0027; B01D 29/46; B30B 9/067; B30B 9/10; A47G 19/16
USPC .................. 210/351, 352; 100/116, 122, 123
See application file for complete search history.

(56) References Cited

U.S. PATENT DOCUMENTS 2,555,195 A * 5/1951 Kostka .................. A44C 5/246 24/71 J
4,045,829 A * 9/1977 Pringle .................. A47C 17/22 5/18.1
6,135,293 A * 10/2000 Herbst ................. B01D 29/824 210/351
9,739,181 B2 * 8/2017 Ozawa .................... F01L 1/245

FOREIGN PATENT DOCUMENTS

JP 2017-044937 A 3/2017

* cited by examiner

*Primary Examiner* — Phuong Chi Thi Nguyen
(74) *Attorney, Agent, or Firm* — ScienBiziP, P.C.

(57) ABSTRACT

An electric connection structure includes: a connection terminal that includes a compression coil spring part; a terminal holding part that includes a base supporting one end surface side of the compression coil spring part and a guide part provided along an outer surface of the compression coil spring part; and a lead wire that includes a folded-back part in one end part. In the electric connection structure, the folded-back part is held between the one end surface of the compression coil spring part and a support part and two lines of the folded-back part are brought into contact with the connection terminal, and the connection terminal and the lead wire are thereby electrically connected.

8 Claims, 10 Drawing Sheets

ELECTRIC CONNECTION STRUCTURE AND IMAGE FORMING APPARATUS

BACKGROUND

1. Field

The present disclosure relates to an electric connection structure and an image forming apparatus, and, in particular, for example, relates to an electric connection structure and an image forming apparatus that include a connection terminal having a compression coil spring part and a lead wire electrically connected to the connection terminal.

2. Description of the Related Art

An example of such a kind of electric connection structure in the related art is disclosed in Japanese Unexamined Patent Application Publication No. 2017-44937. A technique of Japanese Unexamined Patent Application Publication No. 2017-44937 includes a wire, a connection terminal that is configured by a compression coil spring, and a holding member that holds the wire and the connection terminal in a contact state. The holding member includes a base of a plate shape and a projection part that projects in a substantially vertical direction from the base, and the projection part incudes a locking part that locks the connection terminal in a contacted manner. The wire is held between the base of the holding member: and one end surface of the connection terminal, so that the connection terminal and the wire are electrically connected.

In the technique of Japanese Unexamined Patent-Application Publication No. 2017-44937, the connection terminal is arranged so as to be placed on one lead wire that linearly extends, so that balance is not good. Thus, the connection terminal is liable to incline, and a contact state between the lead wire and the connection terminal becomes unstable.

Accordingly, the disclosure mostly provides an electric connection structure and an image forming apparatus that are new.

The disclosure also provides an electric connection structure and an image forming apparatus that are capable of improving stability of contact between a connection terminal and a lead wire.

SUMMARY

An aspect of the disclosure is an electric connection structure including: a connection terminal that includes a compression coil spring part; a terminal holding part that includes a base supporting one end surface side of the compression coil spring part and a guide part provided along am outer surface of the compression coil spring part; and a lead wire that includes a folded-back part in one end part, in which the folded-back part is held between the one end surface of the compression coil spring part and the base and two lines of the folded-back part are brought into contact with the connection terminal, and the connection terminal and the lead wire are thereby electrically connected.

Another aspect of the disclosure is an image forming apparatus including the electric connection structure.

Features and advantages of the disclosure will be further apparent from detailed description of embodiments, which is given below with reference to drawings.

DESCRIPTION OF THE EMBODIMENTS

[First Embodiment]

Figure 1:
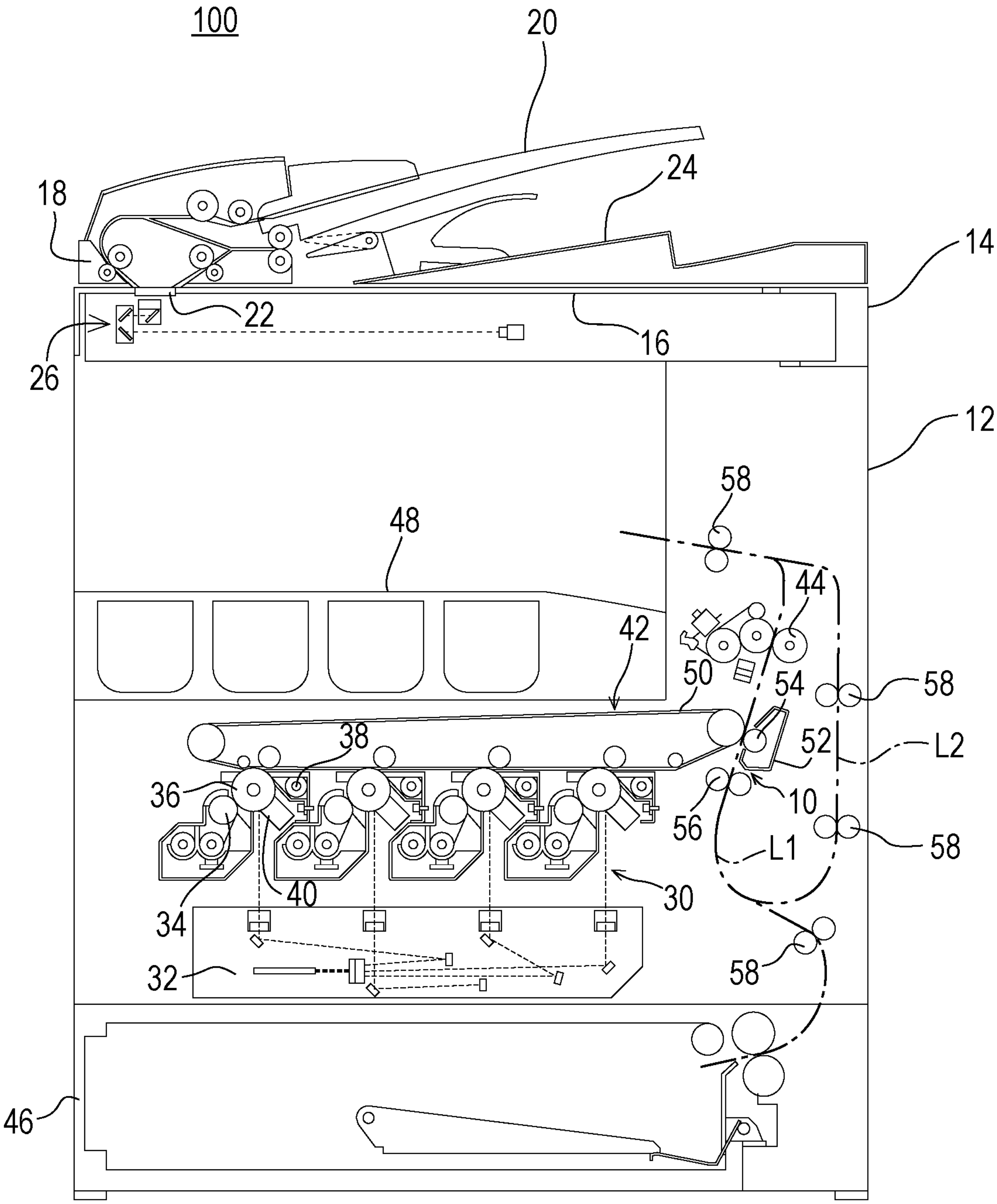
FIG. 1 is a view schematically illustrating an inner structure of an image forming apparatus that includes an electric connection structure serving as a first embodiment of the disclosure.
Figure 2:
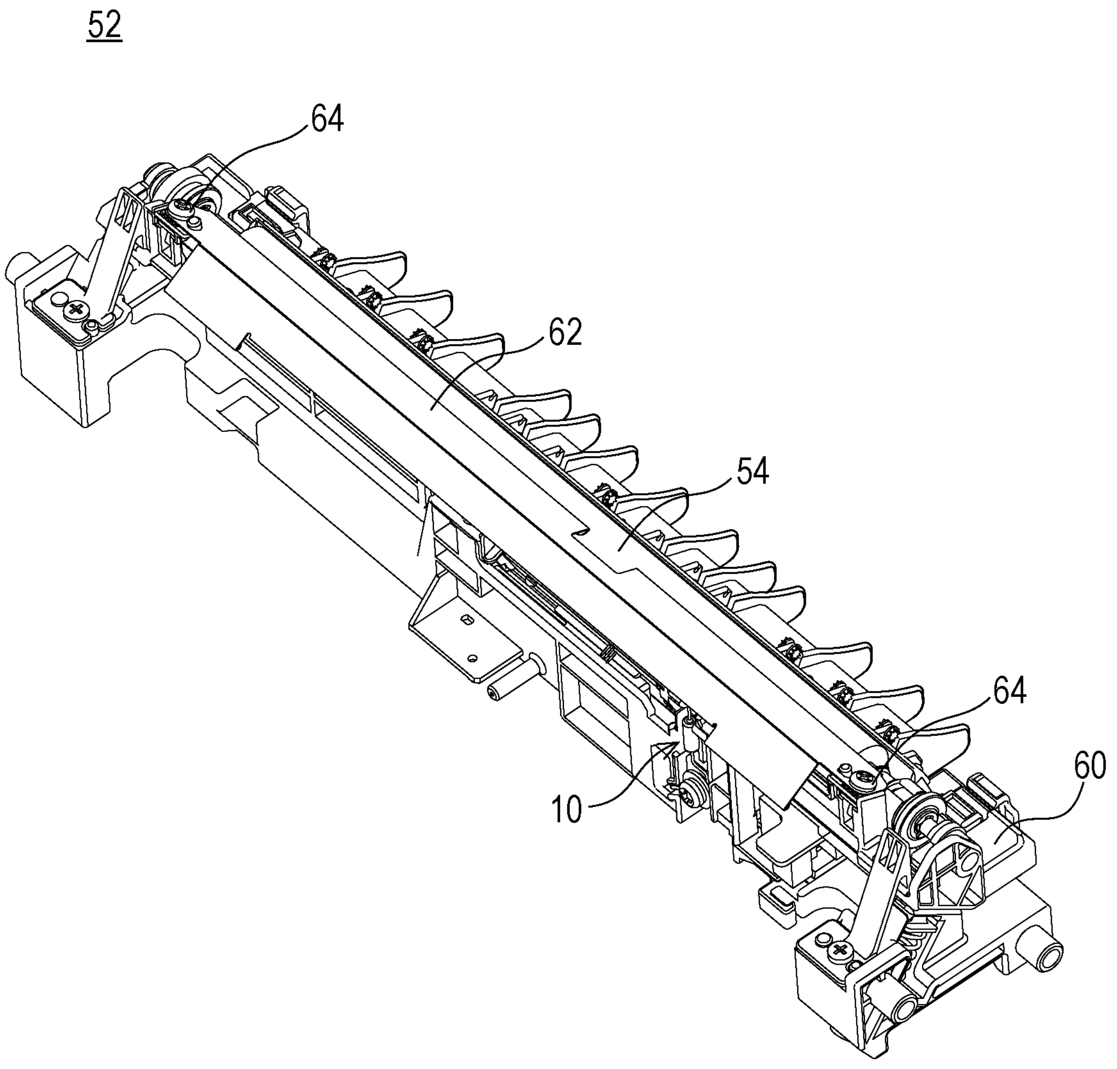
FIG. 2 is a view illustrating a transfer unit provided in the image forming apparatus of FIG. 1.
Figure 3:
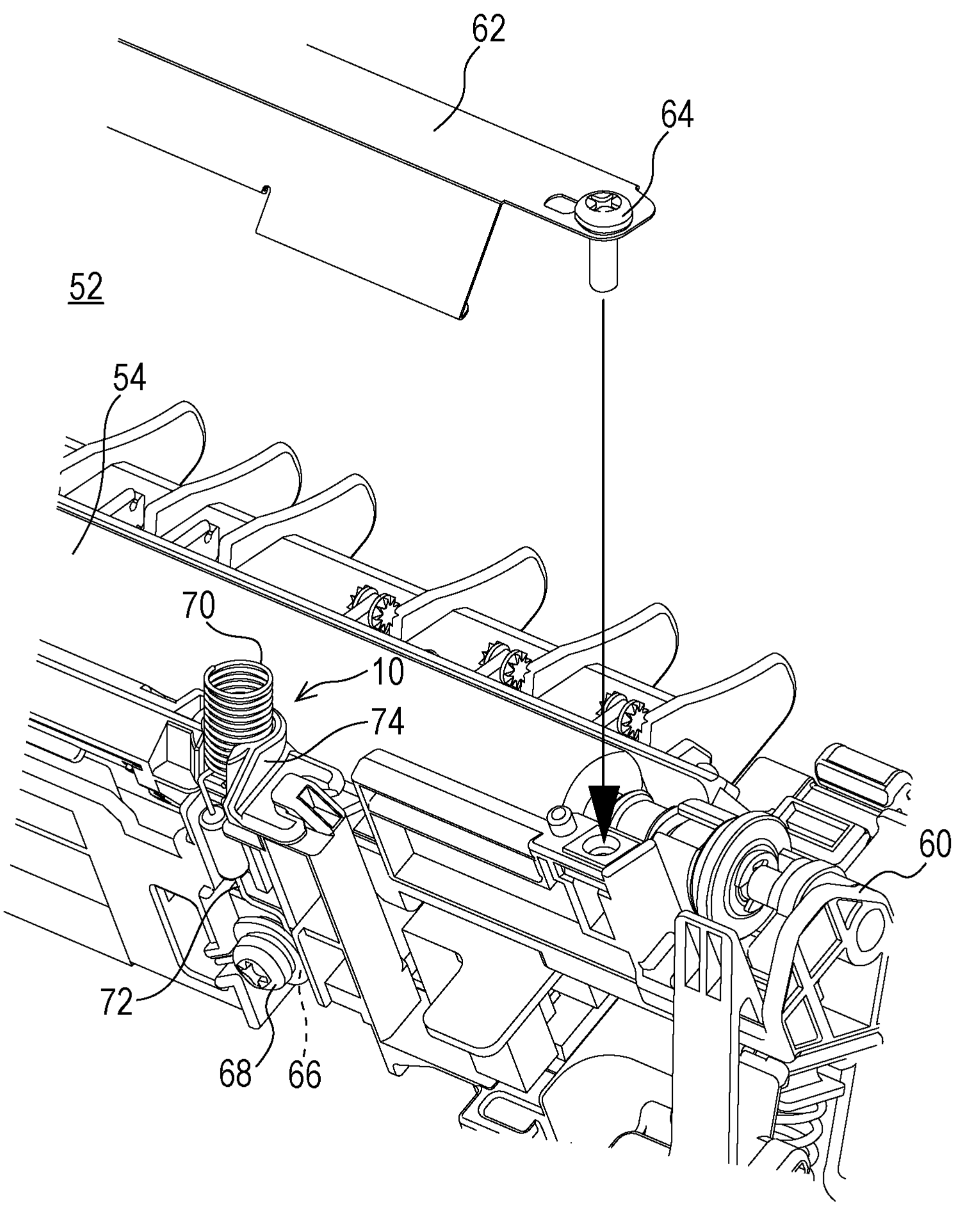
FIG. 3 is a view illustrating an electric connection structure, which is provided in the transfer unit of FIG. 2, in a state where a pre-transfer paper insertion guide is removed.

Referring to FIGS. 1 to 3, an image forming apparatus 100 serving as an embodiment of the disclosure is a color multifunction peripheral that has a copying function, a printer function, a scanner function, a facsimile function, and the like, and forms a multicolored or monochromatic image on a sheet (recording medium) by an electrophotographic system. As specifically described below, the image forming apparatus 100 is provided with an electric connection structure 10 that includes a connection terminal 70, a lead wire 72, and the like. The electric connection structure 10 is provided in a grounding path (earth path) through which a pre-transfer paper insertion guide 62 included in a transfer unit 52 is grounded.

Note that, the image forming apparatus 100 may be any of a copier, a fax machine, a printer, and the like, may be a multifunction peripheral in which at least two of them are combined, or may be a monochrome machine.

First, a configuration of the image forming apparatus 100 will be schematically described. As illustrated in FIG. 1, the image forming apparatus 100 includes an apparatus body 12 provided with an image forming unit 30, and an image reading device 14 arranged above the apparatus body 12.

The image reading device 14 includes a document placing table 16 formed of a transparent material. A document pressing cover 18 is attached above the document placing table 16 via a hinge or the like so as to be freely opened/closed. A document supply tray 20 is provided on an upper surface of the document pressing cover 18, and an automatic document feeder (ADF) is provided inside the document pressing cover 18. The ADF automatically supplies a document placed on the document supply tray 20 to an image reading position 22 in a one-by-one manner and discharges the document to a document discharging tray 24.

Moreover, an image reading unit 26 embedded in the image reading device 14 includes a light source, a plurality of mirrors, an image forming lens, a line sensor, and the like. The image reading unit 26 exposes a surface of a document by the light source, guides reflection light reflected by the surface of the document to the image forming lens by the plurality of mirrors, and then forms an image of the reflection light on a light receiving element of the line sensor by the image forming lens. In the line sensor, luminance and chromaticity of the reflection light the image of which is formed on the light receiving element are detected, and image data based on an image of the surface of the document is generated. A charge coupled device (CCD), a contact image sensor (CIS), or the like is used as the line sensor.

An operation panel (not illustrated) that receives an input operation, such as a printing instruction, which is performed by a user is provided on a front surface side of the image reading device 14. The operation panel has a display with a touch panel, a plurality of operation buttons, and the like.

In addition, the apparatus body 12 is provided with a control unit (not illustrated) that includes a CPU, a memory, and the like and the image forming unit 30. In response to an input operation on the operation panel or the like, the control unit transmits a control signal to each portion of the image forming apparatus 100 and causes the image forming apparatus 100 to execute various operations.

The image forming unit 30 includes an exposure unit 32, a developer 34, a photosensitive drum 36, a cleaner unit 38, a charger 40, a transfer device 42, a fixing unit 44, and the like, and forms an image on a sheet conveyed from a paper feeding cassette 46 or the like and discharges the sheet subjected to image formation to a paper discharging tray 48. As image data for forming an image on a sheet, image data read by the image reading unit 26, image data transmitted from an external computer, or the like is used.

Note that, image data handled in the image forming apparatus 100 corresponds to a color image of four colors of black (K), cyan (C), magenta (M), and yellow (Y). Accordingly, four developers 34, four photosensitive drums 36, four cleaner units 38, and four chargers 40 are provided so as to form four types of latent images corresponding to the respective colors, and four image stations are thereby configured.

The photosensitive drum 36 is an image carrier in which a photosensitive layer is formed on a surface of a cylindrical base having conductivity, and the charger 40 is a member that charges a surface of the photosensitive drum 36 to predetermined potential. The exposure unit 32 is configured as a laser scanning unit (LSU) that includes a laser emitting unit, a reflecting mirror, and the like, and exposes the charged surface of the photosensitive drum 36 to thereby form an electrostatic latent image corresponding to image data on the surface of the photosensitive drum 36. The developer 34 actualizes the electrostatic latent image formed on the surface of the photosensitive drum 36 with toner of a corresponding one of the four colors (YMCK). The cleaner unit 38 removes toner remaining on the surface of the photosensitive drum 36 after development and image transfer.

The transfer device 42 is a device that transfers the toner image formed on the photosensitive drum 36 onto a sheet, and includes an intermediate transfer unit 50 and the transfer unit (secondary transfer unit) 52. Note that, the transfer device 42 is not necessarily a device of an intermediate transfer system that is provided with the intermediate transfer unit 50, and may adopt a configuration in which the toner image on the photosensitive drum 36 is directly transferred onto a sheet by the transfer unit.

The intermediate transfer unit 50 includes an intermediate transfer belt, a suspension roller, four intermediate transfer rollers, and the like, and is arranged above the photosensitive drums 36. At a time of image formation, a predetermined voltage is applied to the intermediate transfer rollers, and a transfer electric field is thereby formed between the photosensitive drums 36 and the intermediate transfer belt. Then, by an action of the transfer electric field, toner images formed on outer peripheral surfaces of the photosensitive drums 36 are sequentially transferred onto an outer peripheral surface of the intermediate transfer belt that circularly moves.

The transfer unit 52 includes a transfer roller 54 that is provided so as to press the intermediate transfer belt. At the time of image formation, a predetermined voltage is applied to the transfer roller 54, and a transfer electric field is thereby formed between the intermediate transfer belt and the transfer roller 54. Then, by an action of the transfer electric field, the toner images formed on the outer peripheral surface of the intermediate transfer belt are transferred onto a sheet while the sheet passes through a transfer nip part between the intermediate transfer belt and the transfer roller 54. Moreover, the electric connection structure 10 is provided in the transfer unit 52. Specific configurations of the transfer unit 52 and the electric connection structure 10 will be described later.

The fixing unit 44 includes a heat roller and a pressure roller and is arranged above the transfer unit 52. The heat roller is set to have predetermined fixing temperature, and when the sheet passes through a fixing nip part between the heat roller and the pressure roller, the toner images transferred onto the sheet are melted, mixed, and brought into pressure contact, and the toner images are thermally fixed to the sheet.

In an inside of such an apparatus body 12, a first sheet conveyance path L1 through which a sheet conveyed from the paper feeding cassette 46 or the like is sent to the paper discharging tray 48 via a resist roller 56, the transfer nip part, and the fixing nip part is formed. Moreover, a second sheet conveyance path L2 through which, when double-side printing is performed on a sheet, the sheet on which single-side printing has been finished and which has passed through the fixing nip part is returned to the first sheet conveyance path L1 on an upstream side of the transfer roller 54 in a sheet conveyance direction is formed. In the first sheet conveyance path L1 and the second sheet conveyance path L2, a plurality of conveyance rollers 58 that supplementally apply a propelling force to a sheet are appropriately provided.

Subsequently, the transfer unit 52 and the electric connection structure 10 provided in the transfer unit 52 will be specifically described. As illustrated in FIGS. 2 and 3, the transfer unit 52 includes the transfer roller 54, a unit frame 60 that rotatably holds the transfer roller 54, and the like, and is detachably attached to the apparatus body 12.

Moreover, the transfer unit 52 includes the pre-transfer paper insertion guide 62. The pre-transfer paper insertion guide 62 is a conveyance guide that guides, toward the transfer nip part, a sheet conveyed by the resist roller 56, and formed by, for example, metal having conductivity into a long plate shape. Each end part of the pre-transfer paper insertion guide 62 is detachably fixed to the unit frame 60 by using a fastening member 64 such as a screw.

Such a pre-transfer paper insertion guide 62 is liable to be charged by being rubbed with a sheet, so that there is a possibility that a sheet sticks to the pre-transfer paper insertion guide 62 and paper jam is caused or, when a toner image is transferred onto a sheet, the toner image is disturbed and an image defect is caused. Then, to avoid such a failure, the pre-transfer paper insertion guide 62 is grounded. The electric connection structure 10 of a first embodiment is provided in the grounding path.

Figure 4:
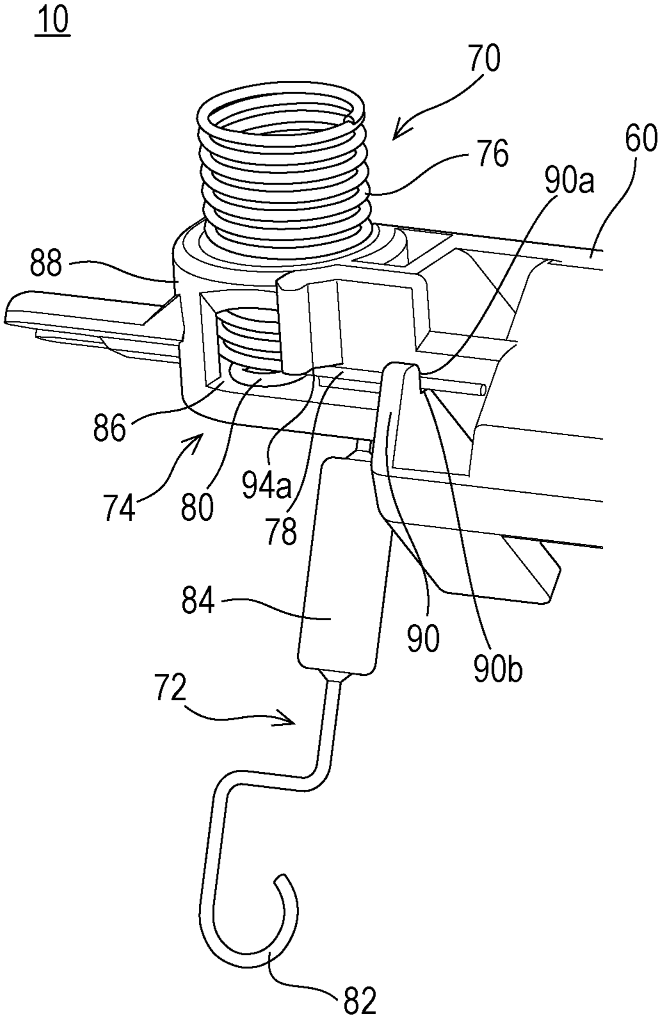
FIG. 4 is a view illustrating a state where the electric connection structure of FIG. 3 is viewed from an extending part side of a connection terminal.

As illustrated in FIGS. 3 and 4, the electric connection structure 10 includes the connection terminal 70, the lead wire 72, a terminal holding part 74, and the like, and electrically connects the pre-transfer paper insertion guide 62 and a contact part 66 that is connected to a metal frame (not illustrated) of the apparatus body 12. That is, in a state where the transfer unit 52 is attached to the apparatus body 12, the grounding path that reaches the metal frame of the apparatus body 12 from the pre-transfer paper insertion guide 62 via the connection terminal 70 and the lead wire 72 of the electric connection structure 10 is formed.

Figure 5:
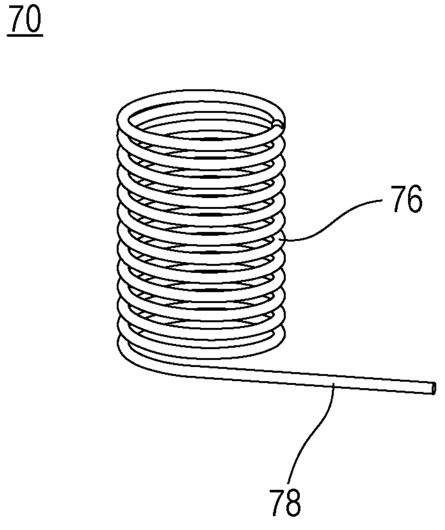
FIG. 5 is a view illustrating the connection terminal provided in the electric connection structure of FIG. 3.

As illustrated in FIG. 5, the connection terminal 70 includes a compression coil spring part 76 and an extending part 78, and is formed by deforming and processing one wire material (such as a nickel chrome wire) that has conductivity.

The compression coil spring part 76 has a cylindrical shape in which the wire material is spirally wound so as to be able to expand/contract in an axial direction. When being compressed by the pre-transfer paper insertion guide 62 in the axial direction, the compression coil spring part 76 is brought into contact with the pre-transfer paper insertion guide 62 with a predetermined pressure and electrically connected therewith. The extending part 78 linearly extends toward outside from one end part of the compression coil spring part 76. The extending part 78 is used for retaining and fixing the contact terminal 70.

Figure 6:
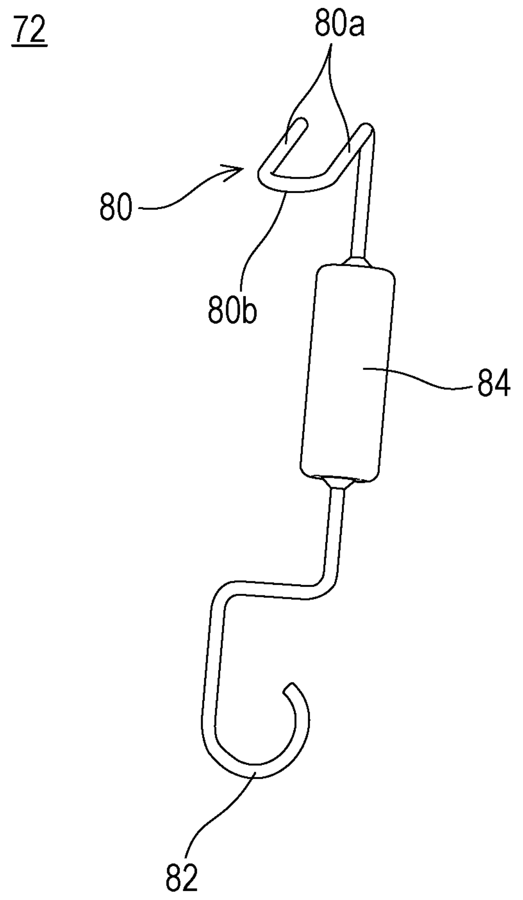
FIG. 6 is a view illustrating a lead wire provided in the electric connection structure of FIG. 3.

As illustrated in FIG. 6, the lead wire 72 is formed by a wire material having conductivity, and electrically connects the connection terminal 70 and the contact part 66. In one end part of the lead wire 72, a folded-back part 80 that is a connection part to the connection terminal 70 and has a U-shape is formed. The folded-back part 80 includes two linear parts 80*a* that extend in parallel with a predetermined interval therebetween and a coupling part 80*b* that couples the linear parts 80*a*. On the other hand, in the other end part of the lead wire 72, a curved part 82 that is a connection part to the contact part 66 and has a circular-arc shape is formed.

Moreover, in the present embodiment, a resistor 84 is provided in a center of the lead wire 72. That is, the pre-transfer paper insertion guide 62 is grounded via the resistor 84. Although the resistor 84 is not necessarily provided, when the pre-transfer paper insertion guide 62 is grounded via the resistor 84, it is possible to suppress leakage of a transfer current via a sheet or the pre-transfer paper insertion guide 62 in a high humidity environment.

Figure 7:
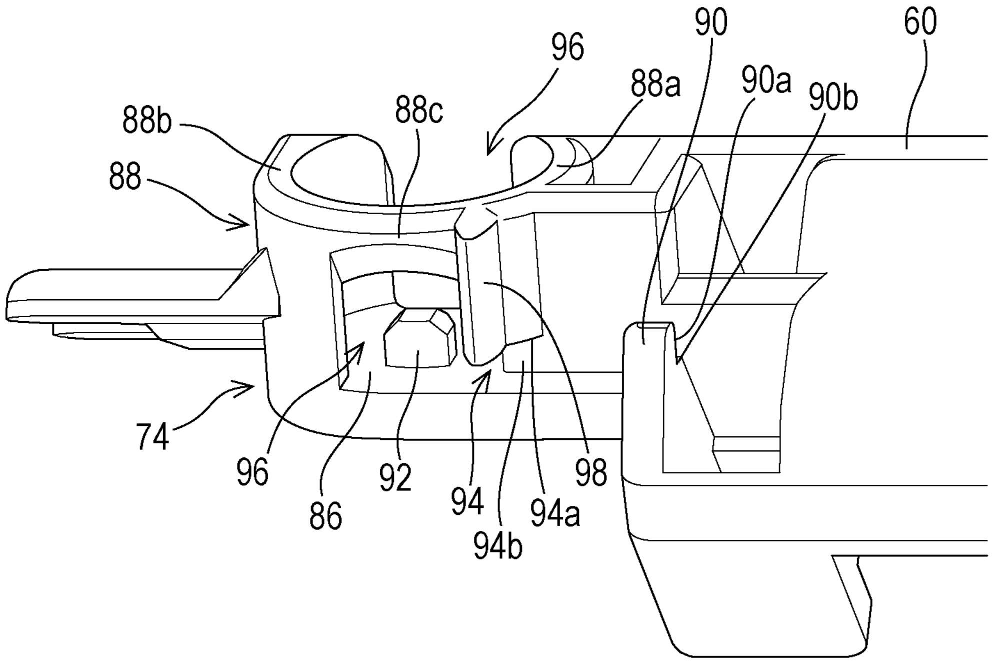
FIG. 7 is a view illustrating a terminal holding part provided in the electric connection structure of FIG. 3.

As illustrated in FIG. 7, the terminal holding part 74 is a portion that holds the connection terminal 70, and formed in the unit frame 60. The terminal holding part 74 is formed by, for example, synthetic resin having electric insulation, and includes a base 86, a guide part 88, a protrusion 90, and the like.

The base 86 is formed into a flat plate shape, and supports one end surface side of the compression coil spring part 76 of the connection terminal 70 via the folded-back part 80 of the lead wire 72. That is, the base 86 is a support part that supports the one end surface side of the compression coil spring part 76 and is also an arrangement part of the folded-back part 80. In the base 86, a projection 92 that projects from the base 86 in a vertical direction and has a substantially rectangular parallelepiped shape is formed. The projection 92 is an engagement part that is engaged with the folded-back part 80 of the lead wire 72 and is also a guide part that guides an inner peripheral surface side of the compression coil spring part 76.

The guide part 88 is an insertion guide part for attaching the connection terminal 70 to the terminal holding part 74 and is also a portion that guides expansion/contraction (deformation in the axial direction) of the compression coil spring part 76, and is erected in the vertical direction from the base 86 so as to be along an outer peripheral surface of the compression coil spring part 76. The guide part 88 guides and holds the outer peripheral surface side of the compression coil spring part 76 to thereby avoid falling down of the compression coil spring part 76. In the present embodiment, the guide part 88 includes a pair of a first circular-arc plate 88*a* and a second circular-arc plate 88*b* that are arranged so as to face each other, and tip part sides of one end parts of the first circular-arc plate 88*a* and the second circular-arc plate 88*b* in a circumferential direction are integrally coupled with each other by a coupling part 88*c*.

Moreover, a base end part side of the one end part of the first circular-arc plate 88*a* in the circumferential direction has a notch, and a slit 94 that extends in the circumferential direction is formed in the notch. That is, the guide part 88 has the slit 94 that extends in the circumferential direction and has a rectangular shape. A top surface 94*a* of the slit 94 is used as a first locking part that locks the extending part 78 of the connection terminal 70 from the other end surface side of the compression coil spring part 76. In addition, an end surface 94*b* of the slit 94 is used as a positioning part that abuts against the extending part 78 of the connection terminal 70 from a side direction (direction orthogonal to the axial direction of the compression coil spring part 76) to thereby determine a position of (stop rotation of) the connection terminal 70 in the circumferential direction.

Furthermore, the guide part 88 has openings 96 between one end parts of the first circular-arc plate 88*a* and the second circular-arc plate 88*b* and between the other end parts thereof, and one of the openings 96 communicates with one end part side of the slit 94. In a boundary portion between the slit 94 and the opening 96, a rib 98 that outwardly projects from an outer surface of the first circular-arc plate 88*a* of the guide part 88 is formed. The rib 98 extends along an axial direction of the guide part 88, and a lower end surface 98*a* of the rib 98 is a tapered surface a width of which becomes wider as being closer to a tip side of the rib 98. Each of the openings 96 is used when the connection terminal 70 and the lead wire 72 are attached to the terminal holding part 74. The rib 98 is used as a guide part of the extending part 78 of the connection terminal 70 and also as a retaining part of the extending part 78, when the connection terminal 70 is attached to the terminal holding part 74.

The protrusion 90 is formed at a position with a predetermined interval outwardly from the guide part 88. At a tip part of the protrusion 90, a step part that has a first surface 90*a* facing the end surface 94*b* of the slit 94 and a second surface 90*b* facing the top surface 94*a* of the slit 94 is formed. The first surface 90*a* of the protrusion 90 is used as a second locking part that locks the extending part 78 of the connection terminal 70 from the direction orthogonal to the axial direction of the compression coil spring part 76. The second surface 90*b* of the protrusion 90 is used as a support part that supports the extending part 78 of the connection terminal 70 from the one end surface side of the compression coil spring part 76. Moreover, a surface opposite to the first surface 90*a*. of the protrusion 90 is an inclined surface that has a downward gradient toward a direction opposite to the first surface 90*a* and has a circular-arc shape (rounded shape). Thereby, when the connection terminal 70 is attached to the terminal holding part 74 as described below, the extending part 78 of the connection terminal 70 easily climbs over the protrusion 90.

Figure 8:
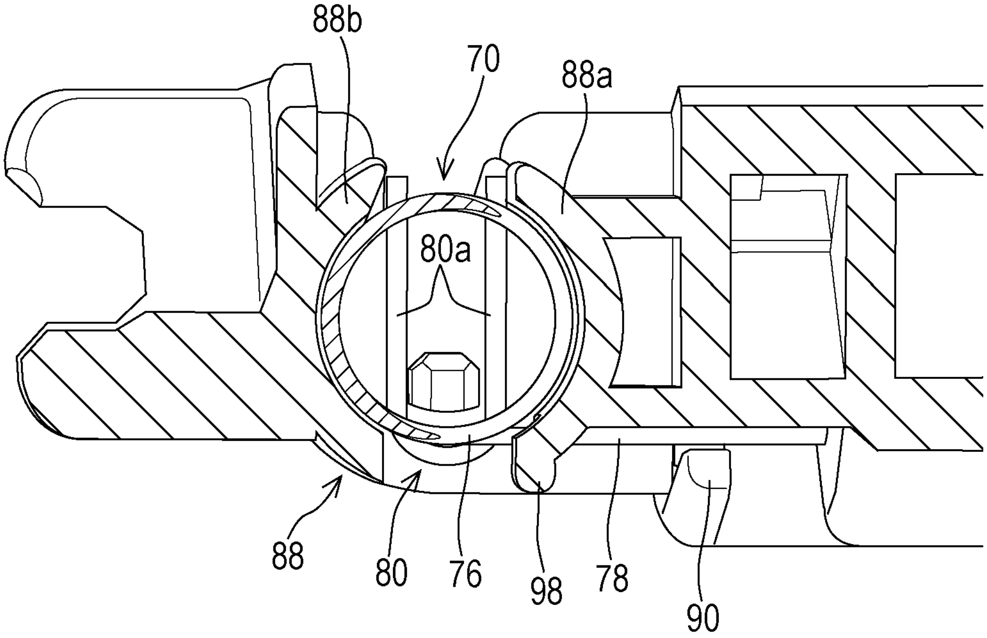
FIG. 8 is a sectional view illustrating a transverse section of the electric connection structure of FIG. 3.
Figure 9A:
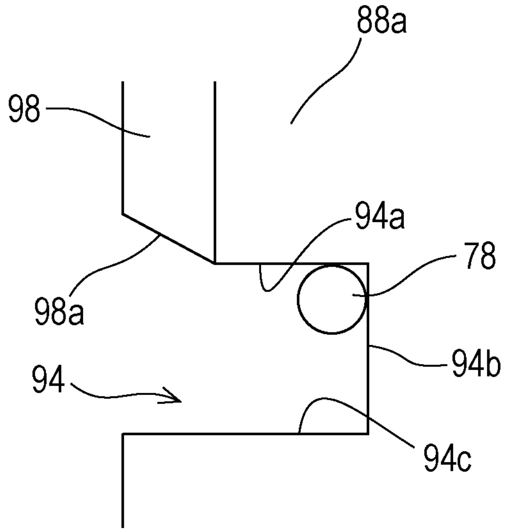
FIG. 9A is a view illustrating a state where a slit portion provided in the electric connection structure of FIG. 3 is viewed from a side.
Figure 9B:
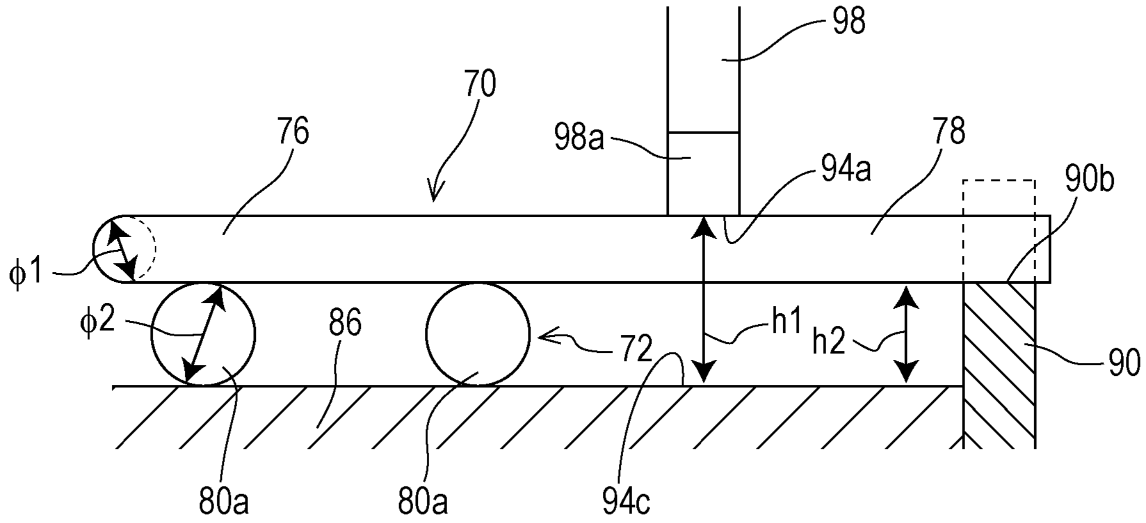
FIG. 9B is a view for explaining a size of each portion of the electric connection structure.

Referring to FIGS. 8, 9A, and 9B together with FIGS. 3 and 4, in the electric connection structure 10 of the first embodiment, the folded-back part 80 of the lead wire 72 is held between the one end surface of the compression coil spring part 76 and the base 86. Then, the lead wire 72 is in contact with the connection terminal 70 at four points of two lines (two linear parts 80*a*) of the folded-back part 80. That is, the connection terminal 70 is sup-ported by the lead wire 72 in a contacted manner at the four points with a predetermined interval, so that abutting balance of the connection terminal 70 is enhanced and contact stability between the connection terminal 70 and the lead wire 72 is improved.

Moreover, the extending part 78 of the connection terminal 70 is locked by the top surface 94*a* (first locking part) of the slit 94 from the other end surface side of the compression coil spring part 76, so that the connection terminal 70 is inhibited from coming off from the terminal holding part 74. Thus, it is possible to reliably make the connection terminal 70 and the lead wire 72 in contact without using a fastening member such as a screw.

In addition, the extending part 78 of the connection terminal 70 is locked by the first surface 90*a* (second locking part) of the protrusion 90 from the direction orthogonal to the axial direction of the compression coil spring part 76, so that it is possible to more reliably inhibit the connection terminal 70 from coming off from the terminal holding part 74.

Furthermore, at a position of the extending part 78, which is further on a tip side than the slit 94, the extending part 78 of the connection terminal 70 is supported by the second surface 90*b* (support part) of the protrusion 90 from the one end surface side of the compression coil spring part 76. That is, by locking the extending part 78 at two positions and in two directions (installation positions and directions of locking surfaces are different between the first locking part and the second locking part), the abutting balance of the connection terminal 70 is further enhanced, and the contact stability between the connection terminal 70 and the lead wire 72 is able to be further improved.

Here, it is desired that a length of a distance h1 between the top surface 94*a* of the slit 94 and a bottom surface 94*c* thereof (upper surface of the base 86) is equal to or shorter than a length obtained by adding a diameter $\phi 1$ of the wire material of the connection terminal 70 and a diameter $\phi 2$ of the wire material of the lead wire 72. That is, it is desired that $h1 \leq \phi 1 + \phi 2$ is satisfied. In addition, it is desired that a length of a distance h2 between the second surface 90*b* of the protrusion 90 and the bottom surface 94*c* is equal to or longer than the diameter $\phi 2$ of the wire material of the lead wire 72. That is, it is desired that $h2 \geq \phi 2$ is satisfied. This is because, when the second surface 90*b* of the protrusion 90 lifts up a tip part of the extending part 78 a little, a downward force acts on a base end part side of the extending part 78 with the top surface 94*a* of the slit 94 as a fulcrum and contact performance between the connection terminal 70 and the lead wire 72 is improved.

Figure 10:
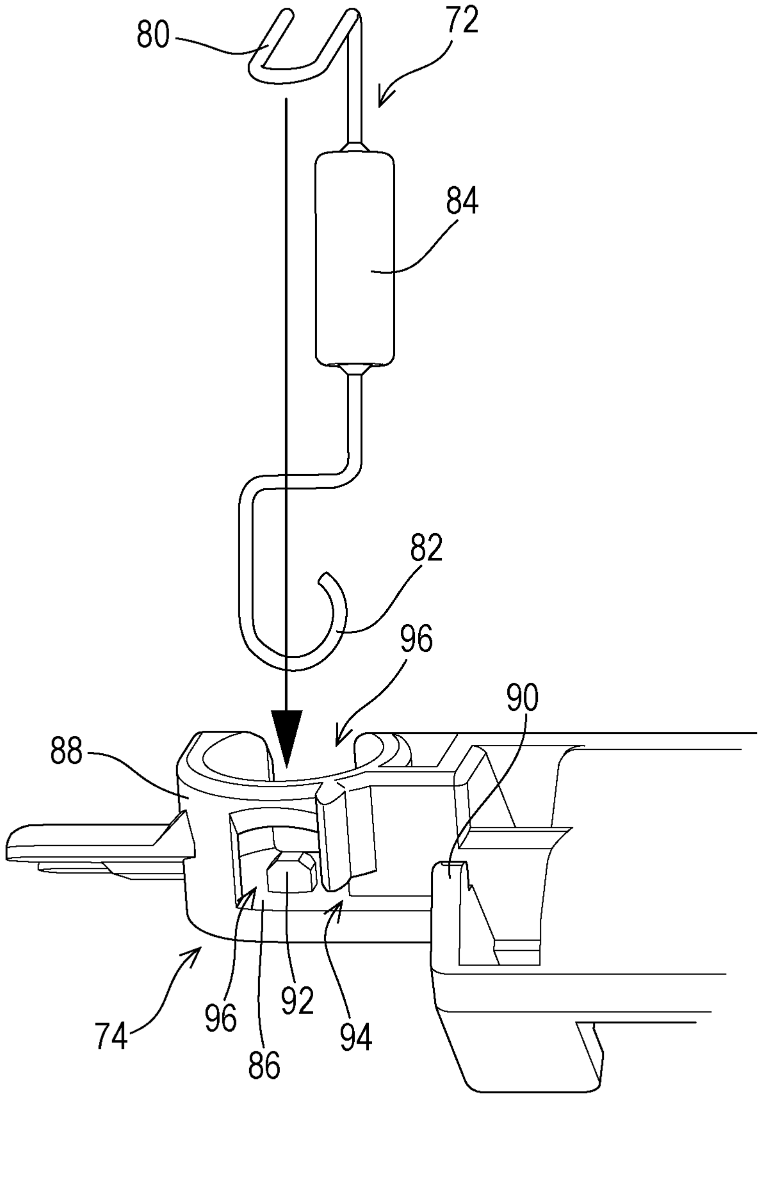
FIG. 10 is a view for explaining an attaching method of attaching the lead wire and the connection terminal to the terminal holding part.

Subsequently, an attaching method of attaching the lead wire 72 and the connection terminal 70 to the terminal holding part 74 will be described with reference to FIGS. 10 and 11. First, as illustrated in FIG. 10, the lead wire 72 is attached to the terminal holding part 74. Specifically, the folded-back part 80 of the lead wire 72 is placed on the base 86 of the terminal holding part 74 so that the projection 92 is fit between the two linear parts 80*a* of the folded-back part 80, and the lead wire 72 is set at a predetermined position. Thereafter, the curved part 82 of the lead wire 72 is fixed to the contact part 66 with a fastening member 68 (refer to FIG. 3).

Figure 11:
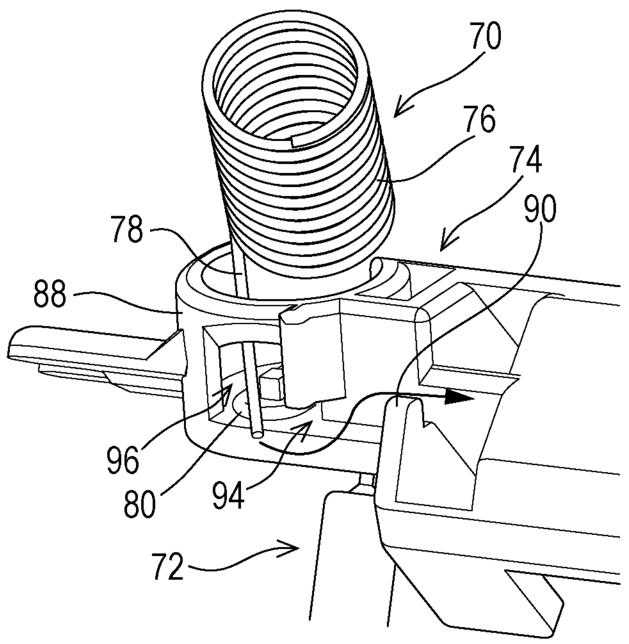
FIG. 11 is a view illustrating a process succeeding to FIG. 10.

After the attaching operation of the lead wire 72 is finished, the connection terminal 70 is attached to the terminal holding part 74 next as illustrated in FIG. 11. Specifically, while the connection terminal 70 is guided by the guide part 88, the extending part 78 of the connection terminal 70 is rotationally inserted into the slit 94 via the opening 96 and caused to climb over the protrusion 90. That is, the extending part 78 is held between the top surface 94*a* of the slit 94 and the second surface 90*b* of the protrusion 90 and the extending part 78 is held also between the end surface 94*b* of the slit 94 and the first surface 90*a* of the protrusion 90, and the connection terminal 70 is set at a predetermined position (refer to FIG. 4). Thereby, the connection terminal 70 and the lead wire 72 are electrically connected in a state where the connection terminal 70 is retained and fixed. As above, in the first embodiment, since the lead wire 72 and the connection terminal 70 are able to be easily attached to the terminal holding part 74, assembling performance is excellent.

After the attaching operation of the connection terminal 70 is finished, the pre-transfer paper insertion guide 62 is attached to the unit frame 60 so as to press the compression coil spring part 76 of the connection terminal 70 from the other end surface side (refer to FIG. 3). Thereby, the connection terminal 70 and the pre-transfer paper insertion guide 62 are electrically connected with predetermined pressure.

As above, according to the first embodiment, the folded-back part 80 of the lead wire 72 is held between the one end surface of the compression coil spring part 76 and the base 86 and the two lines of the folded-back part 80 are brought into contact with the connection terminal 70, and the connection terminal 70 and the lead wire 72 are thereby electrically connected, so that it is possible to stably make the connection terminal 70 and the lead wire 72 in contact. Thus, it is possible to suppress a conduction failure and stably ground the pre-transfer paper insertion guide 62.

Moreover, according to the first embodiment, since the extending part 78 of the connection terminal 70 is locked by the top surface 94*a* (first locking part) of the slit 94 from the other end surface side of the compression coil spring part 76, the connection terminal 70 is retained and fixed at the predetermined position, so that it is possible to reliably make the connection terminal 70 and the lead wire 72 in contact. In addition, since the connection terminal 70 and the lead wire 72 are able to be connected without using a fastening member such as a screw, it is possible to reduce the number of parts and simplify a structure. Further, an assembling operation is also facilitated.

Furthermore, according to the first embodiment, since the extending part 78 of the connection terminal 70 is locked by the first surface 90*a* (second locking part) of the protrusion 90 from the direction orthogonal to the axial direction of the compression coil spring part 76, the connection terminal 70 is more reliably retained and fixed.

[Second Embodiment]

Next, the electric connection structure 10 serving as a second embodiment of the disclosure will be described with reference to FIG. 12. In the first embodiment described above, the opening 96 that communicates with the one end part side of the slit 94 is formed in the guide part 88 of the terminal holding part 74, but the second embodiment is different in that the opening 96 that communicates with the slit 94 is not formed. The second embodiment is the same as the first embodiment except for this, so that a content different from that of the first embodiment will be described and redundant description will be omitted.

Figure 12:
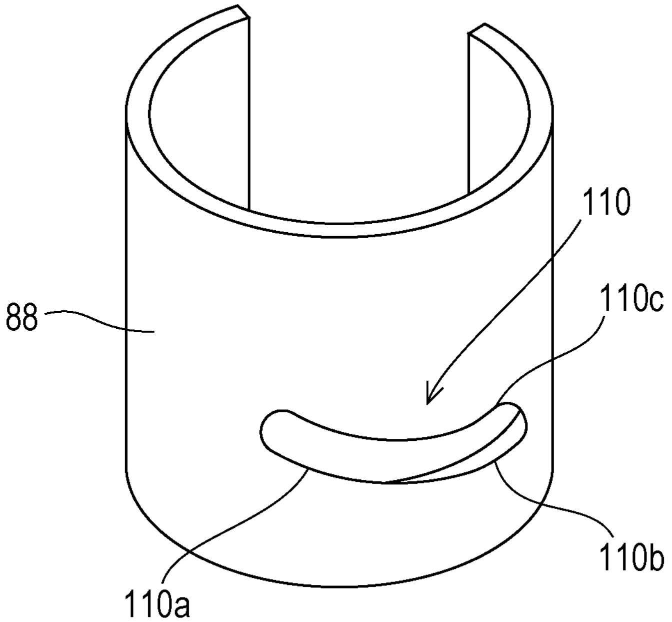
FIG. 12 is a view illustrating a terminal holding part provided in an electric connection structure serving as a second embodiment of the disclosure.

As illustrated in FIG. 12, in the second embodiment, a slit 110 that extends in the circumferential direction of the guide part 88 is formed in the guide part 88. The slit 110 has a first slit part 110*a* that is inclined obliquely downward and a second slit part 110*b* that extends in the circumferential direction. A top surface 110*c* of the second slit part 110*b* is used as a first locking part that locks the extending part 78 of the connection terminal 70 from the other end surface side of the compression coil spring part 76, and, since the top surface 110*c* (first locking part) locks the extending part 78 of the connection terminal 70, the connection terminal 70 is inhibited from coming off from the terminal holding part 74. Thereby, it is possible to reliably make the connection terminal 70 and the lead wire 72 in contact without using a fastening member such as a screw.

An acting effect similar to that of the first embodiment is exerted also in the second embodiment, so that it is possible to stably make the connection terminal 70 and the lead wire 72 in contact and suppress a conduction failure.

Note that, a shape of the slit formed in the guide part 88 is not limited to an aspect of the first embodiment or the second embodiment and is able to be appropriately modified.

Figure 13A:
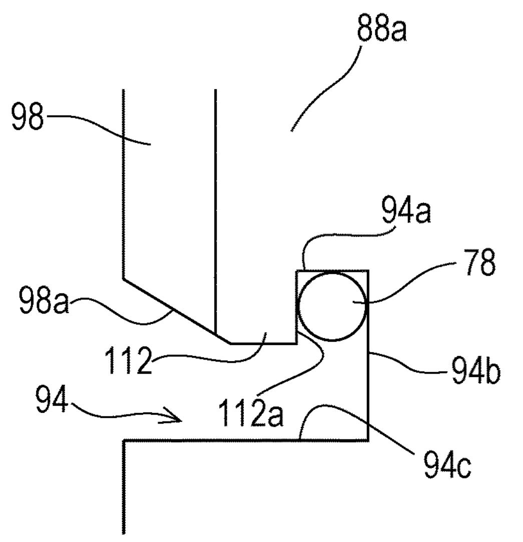
FIG. 13A is a view illustrating another example of the terminal holding part.

For example, although the protrusion 90 is formed at a position apart from the slit 94 in the first embodiment described above, as illustrated in FIG. 13A, a protrusion 112 may be formed in the top surface 94*a* of the slit 94 and one side surface 112*a* of the protrusion 112 may be used as a second locking part that locks the extending part 78 of the connection terminal 70 from the direction orthogonal to the axial direction of the compression coil spring part 76. That is, the second locking part may be formed in the guide part 88.

Figure 13B:
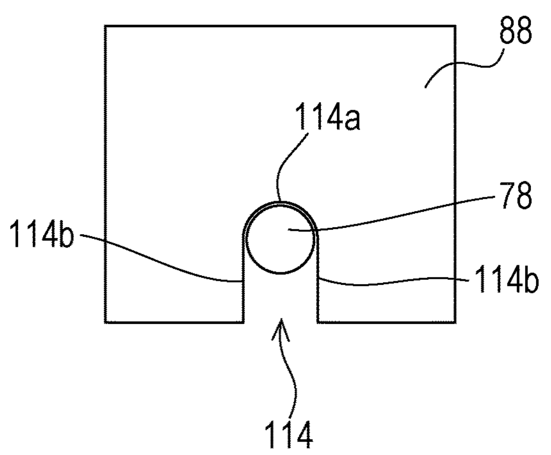
FIG. 13B is a view illustrating still another example of the terminal holding part.

Moreover, for example, in the guide part 88, a slit 114 that extends in the axial direction of the guide part 88 may be formed as illustrated in FIG. 13B. In this case, a top surface 114*a* of the slit 114 is used as a first locking part that locks the extending part 78 of the connection terminal 70 from the other end surface side of the compression coil spring part 76, and a side surface 114*b* of the slit 114 is used as a second locking part that locks the extending part 78 from the direction orthogonal to the axial direction of the compression coil spring part 76.

Note that, the first locking part that locks the extending part 78 from the other end surface side of the compression coil spring part 76 is not necessarily formed in the guide part 88, and may be formed in the terminal holding part 74 at a position apart from the guide part 88 similarly to the second locking part.

[Third Embodiment]

Subsequently, the electric connection structure 10 serving as a third embodiment of the disclosure will be described with reference to FIG. 14. Although the connection terminal 70 and the lead wire 72 are brought into contact at the four points of the two lines of the folded-back part 80 in the first embodiment described above, the third embodiment is different in a contact manner between the connection terminal 70 and the lead wire 72. The third embodiment is the same as the first embodiment except for this, so that a content different from that of the first embodiment will be described and redundant description will be omitted.

Figure 14:
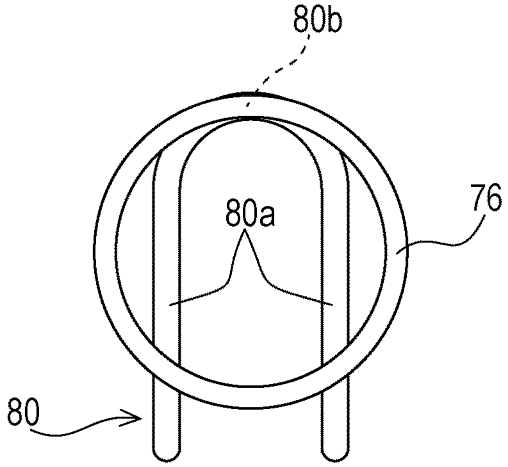
FIG. 14 is a view illustrating an arrangement relation between a connection terminal and a lead wire in an electric connection structure serving as a third embodiment of the disclosure.

As illustrated in FIG. 14, in the third embodiment, the lead wire 72 is in contact with the connection terminal 70 at three points of the two linear parts 80*a* of the folded-back part 80 and the coupling part 80*b* thereof. That is, the connection terminal 70 is supported by the lead wire 72 at the three points with a predetermined interval in a contacted manner.

An acting effect similar to that of the first embodiment is exerted also in the third embodiment, so that it is possible to stably make the connection terminal 70 and the lead wire 72 in contact and suppress a conduction failure.

Figure 15:
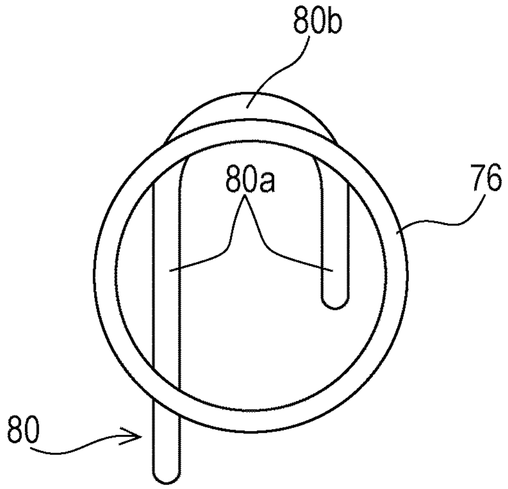
FIG. 15 is a view illustrating another example of the arrangement relation between the connection terminal and the lead wire in the electric connection structure.

Note that, although the folded-back part 80 of the lead wire 72 is formed into a U-shape in each of the above-described embodiments, a shape of the folded-back part 80 is able to be appropriately modified as long as the shape enables multi-point contact of the connection terminal 70 at three or more points with a predetermined interval. For example, the folded-back part 80 may be formed into a J-shape and the connection terminal 70 and the lead wire 72 may be brought into contact at three points of the two lines of the folded-back part 80 as illustrated in FIG. 15. Moreover, for example, the folded-back part 80 is able to be formed also into a V-shape, though illustration thereof will be omitted. Furthermore, for example, the folded-back part 80 may be formed into an N-shape or a W-shape to thereby enable multi-point contact of the connection terminal 70 at two or more lines of the folded-back part 80.

In addition, although the electric connection structure 10 is provided in the grounding path of the pre-transfer paper insertion guide 62 included in the transfer unit 52 in each of the above-described embodiments, there is no limitation thereto. For example, the electric connection structure 10 may be provided in a grounding path of another conveyance guide, or the electric connection structure 10 may be provided not in a grounding path but in an electric path through which power is supplied or an electric signal is transmitted. Moreover, the electric connection structure 10 is able to be applied not only to an image forming apparatus but also to electronic equipment such as a personal computer or a television receiver.

Further, any of specific numerical values and shapes of parts that are cited above is merely an example, and is able to be appropriately modified in accordance with necessity for specifications of a product.

The present disclosure contains subject matter related to that disclosed in Japanese Priority Patent Application JP 2017-237993 filed in the Japan Patent Office on Dec. 12, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An electric connection structure comprising:

a connection terminal that includes a compression coil spring part;

a terminal holding part that includes a base supporting one end surface side of the compression coil spring part and a guide part provided along an outer surface of the compression coil spring part; and a lead wire that includes a folded-back part in one end part, wherein the folded-back part is held between the one end surface of the compression coil spring part and the base and two lines of the folded-back part are brought into contact with the connection terminal, and the connection terminal and the lead wire are thereby electrically connected.

2. The electric connection structure according to claim 1, wherein the terminal holding part includes a second locking part that locks the extending part from a direction orthogonal to an axial direction of the compression coil spring part.

3. The electric connection structure according to claim 1, wherein the connection terminal includes an extending part that extends outward from one end part of the compression coil spring part, and the terminal holding part includes a first locking part that locks the extending part from another end surface side of the compression coil spring part.

4. The electric connection structure according to claim 3, wherein the guide part includes a slit that extends in a circumferential direction of the guide part, and the slit is used as the first locking part.

5. The electric connection structure according to claim 4, wherein the guide part includes an opening that communicates with one end part side of the slit.

6. The electric connection structure according to claim 5, wherein the terminal holding part includes, in a boundary portion between the slit and the opening, a rib that projects from an outer surface of the guide part.

7. An image forming apparatus comprising the electric connection structure comprising an electric connection structure;

the electric connection structure comprising:

a connection terminal that includes a compression coil spring part;

a terminal holding part that includes a base supporting one end surface side of the compression coil spring part and a guide part provided along an outer surface of the compression coil spring part; and a lead wire that includes a folded-back part in one end part, wherein the folded-back part is held between the one end surface of the compression coil spring part and the base and two lines of the folded-back part are brought into contact with the connection terminal, and the connection terminal and the lead wire are thereby electrically connected.

8. The image forming apparatus according to claim 7, wherein the electric connection structure is provided in a grounding path through which a pre-transfer paper insertion guide included in a transfer unit is grounded.

* * * * *